United States Patent [19]

Palmer, Jr. et al.

[11] Patent Number: 4,700,296

[45] Date of Patent: Oct. 13, 1987

[54] ELECTRONIC ACCESS CONTROL SYSTEM

[76] Inventors: Roy A. Palmer, Jr., 822 Northbrook Dr.; David H. Scoggins, 6100 Donnybrook Rd.; Thomas N. Owen, 1001 Deerfield Dr., all of Raleigh, N.C. 27609

[21] Appl. No.: 725,249

[22] Filed: Apr. 19, 1985

[51] Int. Cl.[4] ........................ H04N 7/18; G04B 47/00

[52] U.S. Cl. ........................................ 364/401; 368/10

[58] Field of Search ................ 364/401; 235/379, 380, 235/385; 368/10; 340/309.15

[56] References Cited

U.S. PATENT DOCUMENTS

| | | | |
|---|---|---|---|
| 4,175,775 | 11/1979 | Kruegle | 283/112 X |
| 4,222,662 | 9/1980 | Kruegle | 283/112 X |
| 4,284,983 | 8/1981 | Lent | 340/571 X |
| 4,484,217 | 11/1984 | Block et al. | 358/86 X |
| 4,575,719 | 3/1986 | Bertagna | 340/825.35 |
| 4,624,578 | 11/1986 | Green | 368/10 |

*Primary Examiner*—Jerry Smith
*Assistant Examiner*—Charles B. Meyer
*Attorney, Agent, or Firm*—Mills & Coats

[57] ABSTRACT

The present invention is a method and apparatus for controlling customer access to rental appliances located in the customer's home or other location away from the direct physical control of the renter. This is accomplished through use of a control module wired into the appliance with a card reader for programming such module.

11 Claims, 6 Drawing Figures

ELECTRONIC ACCESS CONTROL SYSTEM

FIELD OF INVENTION

This invention relates to appliance type means and more particularly to controls for the same.

BACKGROUND OF INVENTION

Appliances such as refrigerators, televisions, washers, dryers and the like are becoming an almost essential part of the modern American home. However, many Americans do not have the financial means to purchase such items. An attractive alternative for such people is rental of the needed appliances. The business of renting appliances, however, involves a rather substantial risk. To begin with, most rental customers are considered a high credit risk. In many instances a customer, upon acquiring possession of an appliance, will remain perpetually delinquent in his or her payments. If the customer refuses to return the appliance, the rentor will have to spend a substantial amount of time and money in reacquiring possession. In the meantime, the rentor is denied any return on his capital investment represented by the appliance. To make matters worse, it is doubtful that the rentor will ever collect amounts past due in such circumstances. Thus, many people are hesitant to enter the business of renting appliances despite a rather high demand for such services.

SUMMARY OF INVENTION

After much research and study into the foregoing problems, the access control system of the present invention has been developed to reduce the credit risk involved in the rental and/or credit sale of appliances and the like.

An access control module containing a single chip microcomputer and an optical card reader is interposed into the power supply of an appliance. The microcomputer exchanges data with a store computer during initialization. The microcomputer uses this data to fetch the proper access code for any given rental period from its internal look-up tables. Similarly, the store computer can determine the proper access code for a given rental period of the same appliance. When the customer makes a rental payment, the store computer posts his account and punches out the access code for the current rental period on an optical card. As long as an optical card having a proper access code is inserted into the optical card reader, power will be supplied to the rental appliance. At the end of any given rental period the microcomputer will automatically change the access code. Therefore, unless a new optical card encoded with the new access code is received, power to the rental appliance will be interrupted.

In view of the above, it is the object of the present invention to provide an access control system for non-owner used appliances capable of disabling the appliances in the event the customer is delinquent in his payments.

It is another object of the present invention to provide an access control system for rental appliances which is capable of displaying the status of the customer's account to encourage prompt payment of amounts due.

Another object of the present invention is to provide an access control system which will automate customer accounting and provide the dealer with the benefits of computerized record keeping.

Another object of the present invention is to provide an access control system for rental appliances which discourages tampering.

Other objects and advantages of the present invention will become apparent and obvious from a study of the following description and the accompanying drawings which are merely illustrative of such invention.

DETAILED DESCRIPTION OF INVENTION

Figure 1:
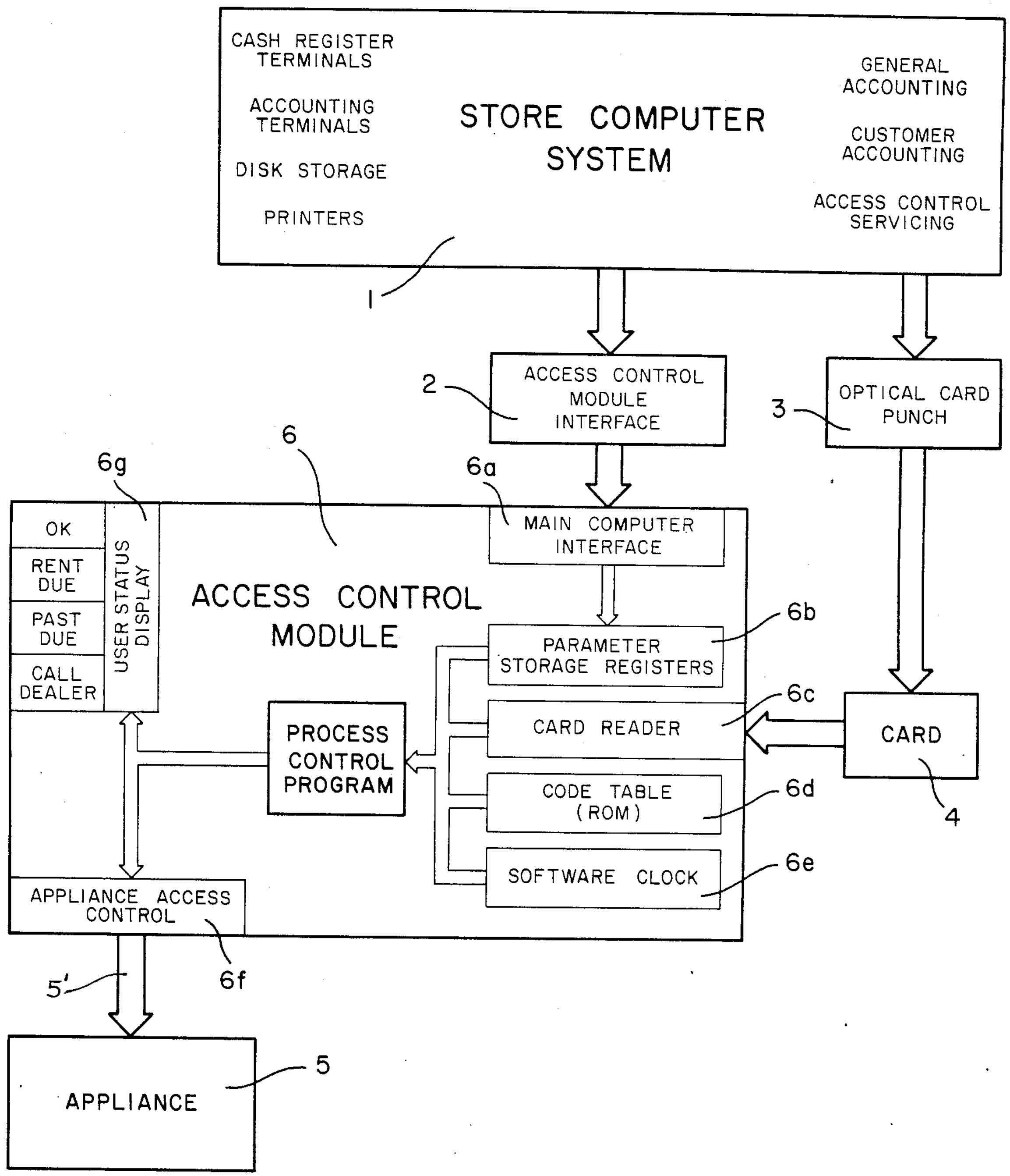
FIG. 1 is a system flow diagram for the electronic access control system of the present invention.

With further reference to the drawings, the access control system of the present invention, indicated generally at 10, including a store computer 1, an access control module interface 2, an optical card punch 3, optical cards 4, the controlled appliance 5, and an access control module 6.

The store computer 1 could be any of a number of commercially available business class computers with attendant peripheral devices such as cash registers terminals, accounting terminals and printers. A more detailed discussion of the store computer 1 is not deemed necessary since these are well known to those skilled in the art.

Software for the computer would handle general business accounting tasks. In addition, specifically developed software would handle customer accounting. The customer accounting software would handle such tasks as setting up customer accounts, printing rental agreements, posting customer accounts after each transaction, invoicing, printing delinquent reports, producing cash flow and other reports and similar functions relating to the servicing of customer accounts. The customer accounting software would also service the access control module 6 as hereinafter described in greater detail.

Figure 2:
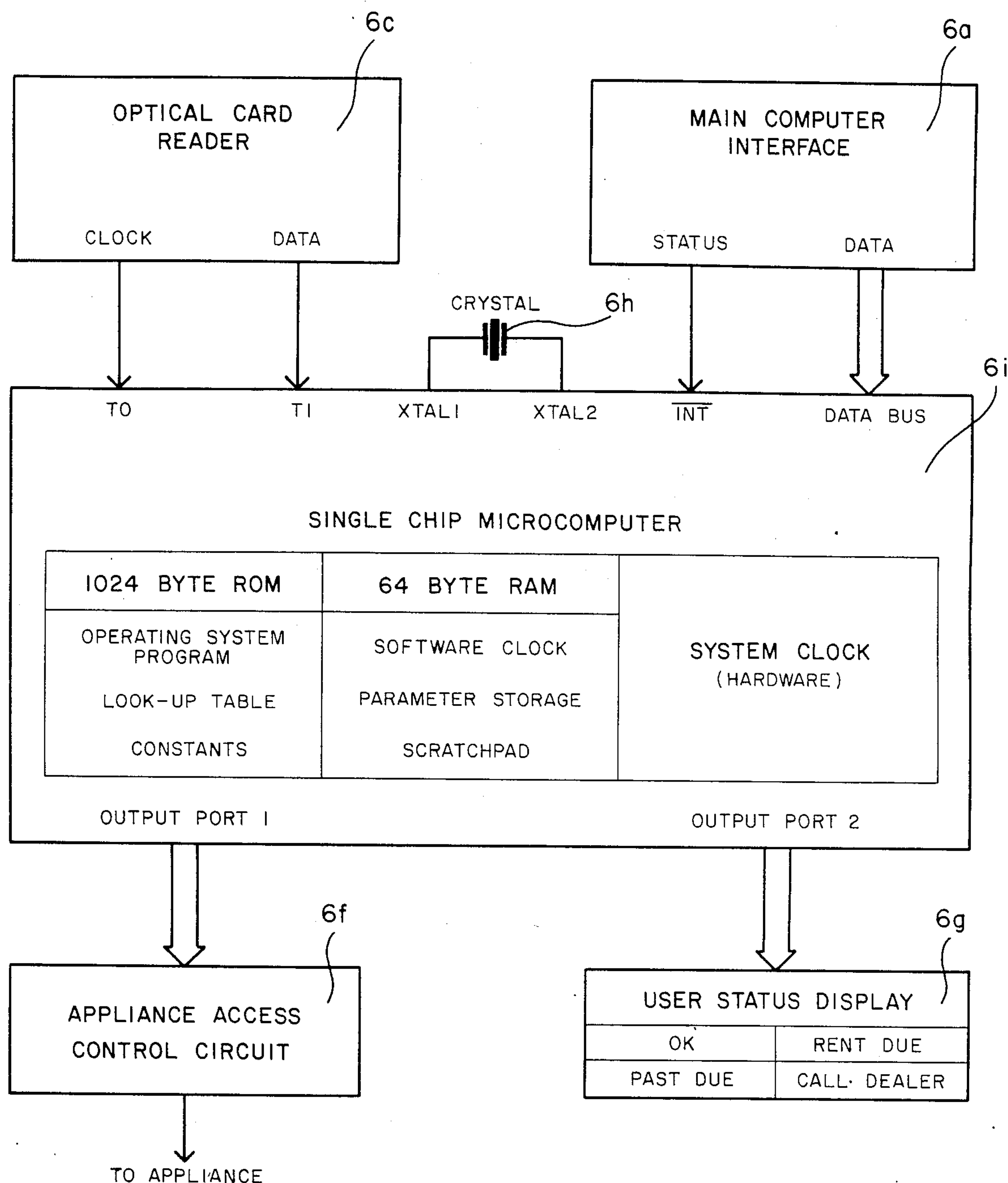
FIG. 2 is a block diagram of the access control module of the present invention.
Figure 3:
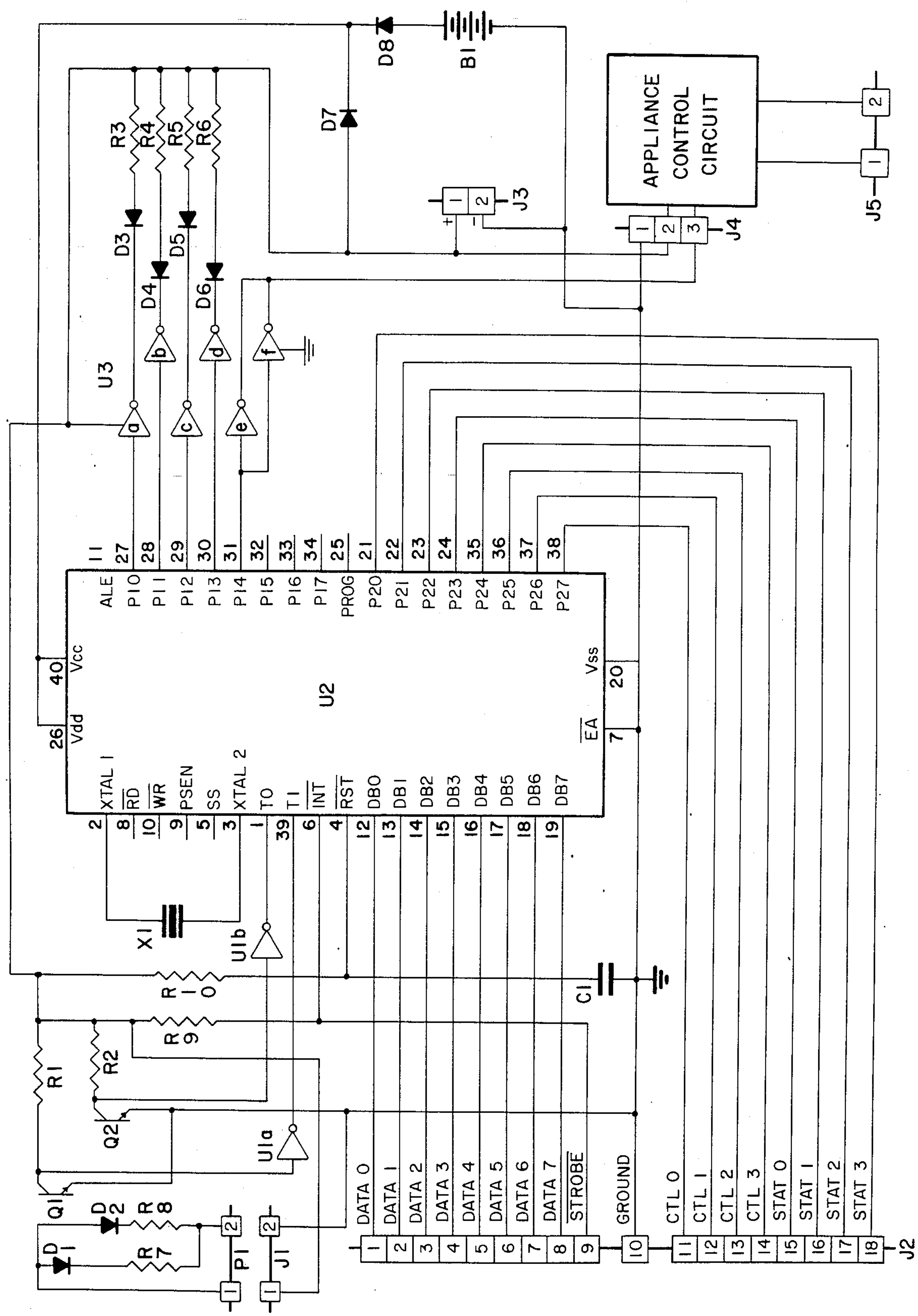
FIG. 3 is a schematic of the access control module.

The access control module 6 comprises a single chip microcomputer U2 with crystal clock reference X1, an optical card reader 6*c*, a user's status display 6*g*, an appliance access control circuit 6*f* and a main computer interface 6*a*. As shown in the schematic diagram of FIG. 2, the main computer interface 6*a* is by direct connection to the single chip computer's bidirectional data bus. A jack J2, is provided for communicatively connecting the access control module 6 to the store computer 1. A cable may be attached between the store computer 1 and the access control module 6 via the access control module interface 2. The access control module interface 2 is simply a piece of hardware designed to make access control module 6 compatible with the particular store computer 1 being used. Since these are commonly known to those skilled in the art, a more detailed discussion of the access control module interface 2 is not deemed necessary. A communications protocol shared by the store computer 1 and the access control module 6 allows orderly exchange of data between the two units. Further communications from the store computer 1 to the access control module 6 is made via the optical card 4.

Figure 4:
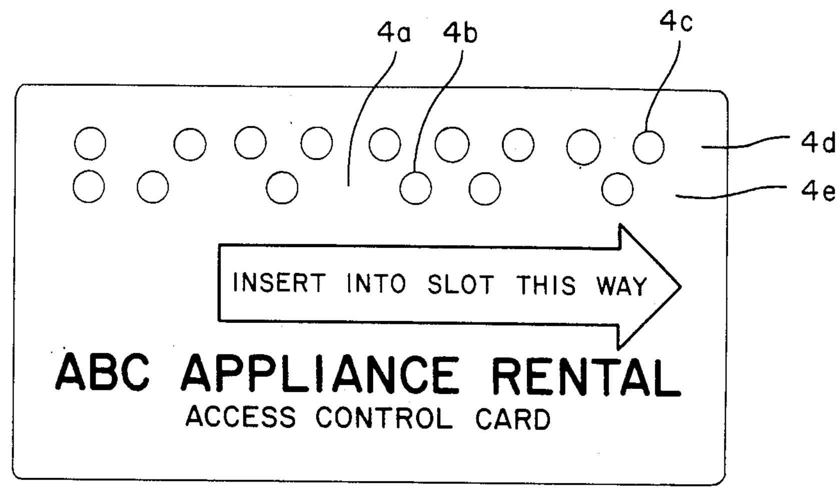
FIG. 4 is a front elevational view of a typical access control card.
Figure 5:
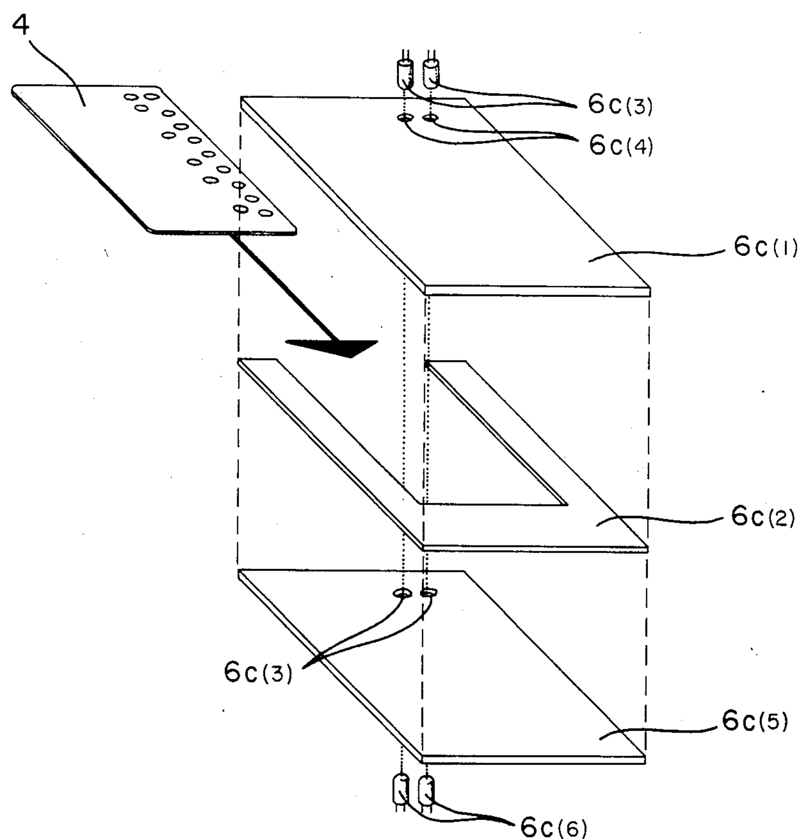
FIG. 5 is an exploded perspective view of the card reading compartment of the present invention.
Figure 6:
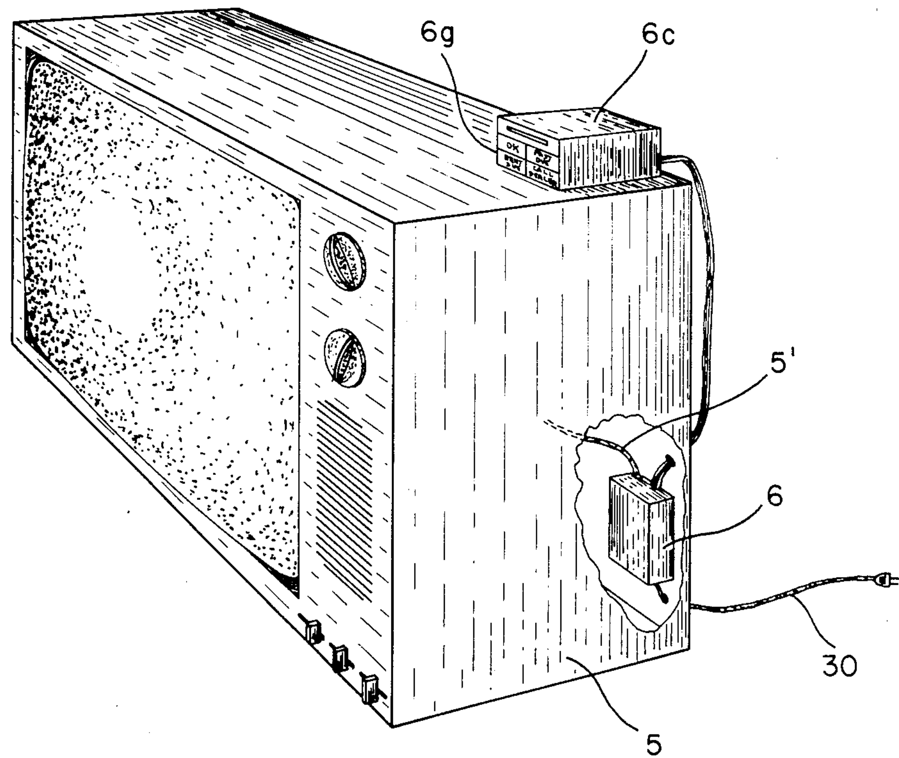
FIG. 6 is a perspective view of the control module operatively mounted on a typical appliance.

The optical card 4 contains two rows of holes punched by an optical card punch 3 under the control of the store computer 1. One row of holes is continuous along the long dimension of the card 4. This row is referred to hereafter as the clock row 4*d*. In the other row, which runs parallel and adjacent to the clock row 4*d*, holes are punched or left intact depending on the logic state of the corresponding bit of data in the byte to be communicated. This row is referred to as data row 4*e*. As is clearly shown in FIG. 4, the data holes 4*b* are generally offset or staggered with respect to their corresponding clock holes 4*c*. However, the last clock hole 4*c* is also offset so as to align with the last data hole 4*b*.

A card compartment guides and aligns the card as it is inserted into the card slot 20 which is formed in the access control module's enclosure 11. There are two infrared light emitting diodes, hereinafter referred to as LEDs, D1 and D2, on one side of the card compartment positioned so that their infrared light is directed toward the card and the rows of holes thereon. Two infrared photo-transistors, Q1 and Q2, are mounted on the other side of the card compartment so that light from the infrared LEDs D1 and D2, shining through the holes in the card 4, will fall on the photo-sensitive face of the photo-transistors Q1 and Q2. Each infrared LED and its associated photo-transistor is referred to as an optical pair. It is appreciated that one optical pair is designed to "read" the holes in the clock row 4*d* while the other optical pair "reads" holes in the data row 4*e*. Hence, each optical pair will be referred to as either the clock optical pair or the data optical pair.

As the card 4 is inserted into the card compartment, each data hole 4*b* will come under the data optical pair slightly after its corresponding clock hole 4*c* passes under the clock optical pair. When the card is fully inserted, the last data hole 4*b* and clock hole 4*c* will be simultaneously positioned between their respective optical pairs indicating that the card is fully inserted.

The signals from the photo-transistors Q1 and Q2 are buffered and converted to TTL levels by the circuit consisting of complementary metal oxide semiconductor (CMOS) buffers U1*a* and U1b and 820,000 ohm resistors R1 and R2. These TTL level signals are then connected to the T0 and T1 inputs of the single chip microcomputer U2. More specifically, signals from the clock optical pair are connected to the T0 input and signals from the data optical pair are connected to the T1 input. Instructions in the microcomputers instruction set allow the logic states of these test inputs to be checked and initiate some action based on their state. The circuit is designed to provide the microcomputer U2 with a logical low (binary 0) when the light between either infrared LED D1 or LED D2, and its associated photo-transistor Q1 or Q2 is blocked and is logical high (binary 1) when the light is allowed to pass through the card to the face of the photo-transistor.

When there is no card 4 in the card compartment, both optical pairs supply a logical high to the microcomputer U2. As the customer begins to insert the card 4 into the card slot, the edge of the card 4 blocks light to both optical pairs, supplying the microcomputer U2 with logical lows on both test inputs, T0 and T1. The microcomputer U2 recognizes this condition and prepares to read the data punched onto the card 4. As the first clock hole 4*c* passes between the clock optical pair, the T0 input of the microcomputer goes to a logical high. When this input goes to a logical low again, indicating the clock hole 4*c* has passed the optical pair, the microcomputer U2 tests the T1 input to see if a logical high will appear there. The computer U2 will test the T1 input in this manner until the T0 goes to a logical high again, indicating the arrival of another clock hole 4*c*. When a high is detected on the T1 input, the computer U2 places a binary 1 in the correct bit position and waits for the next clock hole 4*c*. If the next clock hole 4*c* arrives and the T1 input has not gone high, the microcomputer U2 places a binary 0 in the correct bit position. Bits are read sequentially in this manner until all eight bits which make up the coded byte are retrieved. The microcomputer U2 then checks for a logical high on both T0 and T1 inputs indicating that the card 4 is fully inserted. If the card 4 is removed, both T0 and T1 inputs will go to a logical low state and the microcomputer will note this condition.

One output part of the single chip microcomputer U2 is connected to the appliance access control circuit 6*f* and is dedicated to controlling customer access to the appliance 5. The access control circuit 6*f* can take several configurations depending on the type of appliance to be controlled. For instance, a relay or solid state switch could be used to control the application of AC power to the controlled appliance 5. In the case of a TV receiver, a relay or transistor switching arrangement could interrupt the antenna input to the set or an interface directly into the circuitry of the receiver could disable the set. Since such techniques are commonly known and used by those skilled in the art, a more detailed description of such circuits is not deemed necessary.

The access control circuits 6*f* are probably modular in construction and selected specifically for a given situation at the time of installation on an appliance 5. Once the proper circuit 6*f* is chosen, it is plugged into the access control module at jack J4. Two control lines connect the control output port to the access control circuit. The control lines are buffered by individual buffers U3*e* and U3*f* which are part of a non-inverting open collector TTL buffer containing six individual buffers U3*a* through U3*f*. A control code output on the microcomputer's control output port either allows the controlled appliance 5 to function normally or to prevent operation. All control circuits, of course, are designed so that the appliance 5 will not function properly without the proper control code.

The last hardware element of the access control module is the user's status display 6*g*. The status display 6*g* consists of four light emitting diodes, D3, D4, D5 and D6, which may be mounted in the enclosure for economy or inside the enclosure in a "blind display" configuration for appearance. These LEDs are illuminated to inform the customer that the system is "OK", that "Rent Due", that rent is "Past Due", and/or to "Call Dealer" to restore service.

The LEDs D3, D4, D5, and D6 are controlled by the second output port of the microcomputer. The individual bit outputs of this port are buffered by individual buffers U3*a*, U3*b*, U3*c* and U3*d*, which are part of the non-inverting open collector TTL buffer described above. The outputs of each buffer are connected through a 1000 ohn series current limiting resistor R3, R4, R5, and R6 to the cathode of its associated LED. The anodes of all the LEDS D3, D4, D5 and D6 are connected to a +5 volt power supply B1. When a particular bit on the microcomputer's status display output port goes to a logical low, the associated buffer will provide a drive current capability to brings its output voltage close to ground, making the voltage at the cathode of the associated LED negative with respect to the anode. The LED is then forward biased and will emit light. If the bit is a logical high at the output port, the open collector output of the buffer will float and be pulled up to approximately the anode voltage of the LED. The LED thus biased will not illuminate.

The access control module is powered with a +5 volts which may be provided by either the controlled appliance or its own power supply operating from the customer's home power source. A battery backup B1 is provided to keep the microcomputer U2 operating during power interruptions though other parts of the module 6 are not powered by the battery back-up B1.

The access control module 6 is mounted to the controlled appliance 5 in such a way as to discourage tampering. The access control module's is preferably constructed of steel and is secured to the appliance with tamper resistant or security type screw means. All interconnections between the appliance 5 and the access control module 6 are preferably made beneath the module's enclosure 11. Furthermore, normal access to the interior of the appliance 5 is restricted by the use of tamper resistant or security type screws. Thus, it can be seen that the customer would have to destroy or damage the appliance to attain access to the access control module or its interconnections to the appliance.

The way the access control module 6 operates is dependant on the process control program running or the single chip microcomputer U2 and to some extent on the architecture of the computer chip itself. In the preferred embodiment, the microcomputer contains 1024 bytes of read-only memory or ROM which stores the program and a look-up table of random access codes. The microcomputer also contains 64 bytes of random access memory or RAM which is used to store variables and act as a scratchpad for calculations. The chip also contains an electronic pulse generator which is controlled by crystal X1. This provides an extremely accurate time base which is used to clock the computer and, through the use of certain instructions, keep time of day.

To use the access control system 10 of the present invention, the access control module must first be initialized when the appliance 5 is rented or leased. This involves simply attaching a cable between the store computer 1 and the access control module 6 via the access control module interface 2.

The store computer 1 reads the access control module's serial number which is also stored in the microcomputer's ROM. It then tells the access control module 6 the interval between rental payments, sets the time of day clock, and provides the microcomputer U2 with a seed number to be used in looking up the access control codes. This information is stored in the access control module's RAM. Once the data is exchanged, the cable may be removed and the appliance 5 can be taken to the customer's home for installation. The battery back-up B1 will provide power to the microcomputer U2 during delivery and installation to enable it to retain the information stored in its RAM.

The operating system software in the access control module's single chip microcomputer U2 keeps time based on the crystal controlled clock X1. Time is kept in terms of second, minutes, hours, days and rental periods. The rental period number and the seed number provided by the store computer 1 on initialization are used to mathematically derive an index number which is added to the beginning address of the look-up table to determine the address which contains the access code byte for that rental period.

The store computer 1 has a series of look-up tables in its memory that can be used to determine the proper access code for a given rental period on a given access control module 6. Since the store computer knows the access control module's serial number, it can determine the contents of the access control module's look-up table. The store computer 1 also knows the seed number placed in the access control module 6 and the current rental period. Using this information, the store computer 1 can determine the proper access code byte in the same manner as the access control module does.

When the customer makes a rental payment, the store computer posts the customer's account up to date and determines the access code for the rental interval the customer has paid for. The store computer 1 then prints a receipt for the customer and punches the access code onto a new optical card 4 which is given to the customer. If the customer pays by mail, the receipt and optically encoded card 4 are mailed to him.

At the customer's home, the access control module will allow customer access to use of the appliance 5 only as long as a card 4 containing a proper access code for the current rental period is fully inserted into the card slot. In this condition, the "OK" status LED will glow steadily to assure the customer that the system is operating properly.

In the preferred embodiment, the operating systems program running on the single-chip microcomputer U2 will look ahead three rental periods for the proper code so that advance payments can be accomodated and new cards may be used before the current rental period expires. If the card 4 containing the access code for the next rental period has not been inserted into the access control module twenty four hours before the rental period expires, the "RENT DUE" LED will begin to flash to warn the customer that he needs to make a payment. Of course, the appliance 5 will continue to operate during this 24 hour period. When the rental period expires, the "PAST DUE" LED will flash and access to use of the appliance 5 will be denied. The access control module 6 will prevent operation of the appliance 5 until a card containing the proper access code is inserted into the card slot and read.

In the event that a customer attempts to insert a card 4 with an improper access code or a counterfeit card, the microcomputer U2 will go into a tamper routine after three such attempts. This will allow the customer to make a mistake once or fail to fully insert the card without the adverse consequences of going into a tamper routine. However, if the customer persists in inserting an illegal card, his conduct will start the tamper routine which will illuminate the "CALL DEALER" LED and refuse to allow operation of the appliance 5. The tamper routine may also be initiated if power to the control module 6 is interrupted long enough to run down the battery back-up B1.

From the above it is obvious that the present invention has the advantage of providing the relatively sophisticated electronic access control system which is simple to use by customers and yet allows complete control of the appliance by the dealer. The dealer also gets the additional benefits of automatic customer accounting and computerized record keeping as well as having the comforting knowledge that the rental, leased, or time payment appliance is only being used during the agreed authorized period.

Although the terms "rent", "rental", "leased", and the like are used herein when referring to the appliance being controlled, it is to be understood that the appliance can be either rented, leased, leased purchased, time payment agreement or the like.

The present invention may, of course, be carried out in other specific ways than those herein set forth without departing from the spirit and essential characteristics of the invention. The present embodiments are, therefore, to be considered in all respects as illustrative and not restrictive and all changes coming within the meaning and equivalency range of the appended claims are intended to be embraced therein.

What is claimed is:

1. An access control system for controlling customer access to rental appliances comprising:

(a) an access control module mounted on a rental appliance including means for defining a plurality of rental periods and means for storing an access code corresponding to each said rental period;

(b) elapsed time counting means forming a part of said access control module for determining the then current rental period;

(c) input means operatively connected to said access control module for allowing said customer to enter an access code supplied from an external source;

(d) testing means forming a part of said access control module for comparing the externally supplied access code entered by the customer to the stored access code for the then current rental period and outputting a control signal based on the similarlity or dissimilarity of said codes; and (e) circuit means interconnected with said appliance and responsive to said control signal for disabling or enabling said appliance depending on the status of said control signal.

2. The access control system of claim 1 including a user display means operatively connected to said elapsed time counting means for indicating the expiration of the last rental period for which rent has been paid.

3. The access control system of claim 2 wherein said user display means includes a plurality of light emitting diodes.

4. The access control system of claim 1 wherein said input means is an optical card reader for reading data from an optical card inserted by the customer.

5. The access control module of claim 4 wherein said optical card reader includes a series of light emitting diodes paired with a corresponding series of photo-transistors.

6. The access control system of claim 1 wherein said circuit means is modular whereby the same can be specifically selected for use in connection with a particular appliance to be controlled.

7. An access control system for controlling customer access to use of rental and similar appliances while the same is in the direct physical control of the customer, comprising: an access control module mounted on a rental appliance, said access control module including elapsed time counting means for defining rental periods and look-up table means for assigning a different access code to each rental period; a store computer including look-up table means for determining the proper access code for any given rental period; transfer means to allow the customer to transfer the access code determined by said store computer to said access contrl module upon payment of rent; testing means forming a part of said access control module for comparing the transferred code to the internally assigned code for the current rental period and an outputting control signal based on the similarity or dissimilarity of said codes; and circuit means connected to said access control module and interconnected with said appliance for disabling or enabling the appliance depending on the status of said compared control signal.

8. The access control system of claim 7 wherein said transfer means comprises an optical card, means connected to said store computer for optically encoding said access code on said card, and an optical card reader associated with said access control module for reading the access code from said card.

9. The access control system of claim 8 wherein said optical encoding means includes an optical card punch for punching holes into said optical card.

10. The access control module of claim 9 wherein said optical card reader includes a series of light emitting diodes paired with a corresponding series of photo-transistors whereby said card can be read.

11. The access control system of claim 7 wherein said circuit means is modular whereby the same can be specifically selected for use in connection with a particular appliance to be controlled.

* * * * *